Dec. 24, 1940.   A. I. APPLETON   2,225,945
EXPLOSIONPROOF SWITCH BOX OR THE LIKE
Filed March 25, 1939   2 Sheets-Sheet 1
Fig. 1.
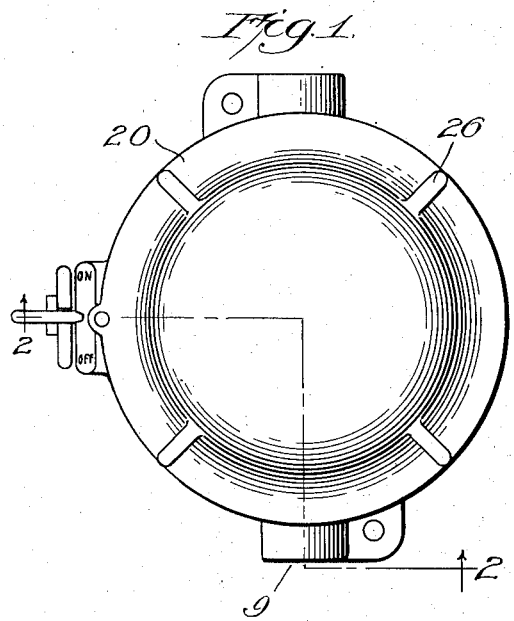
Fig. 3.
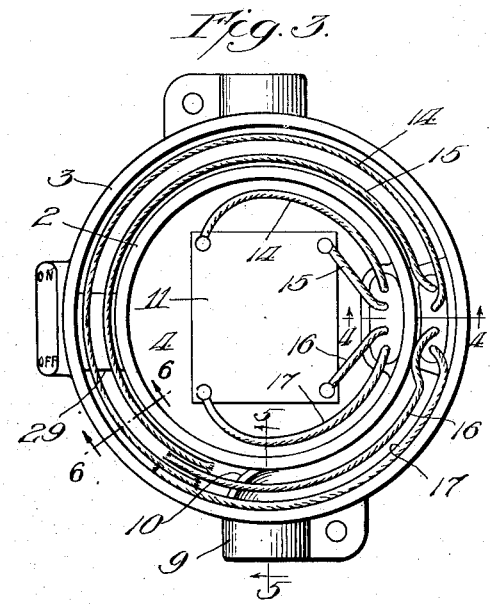
Fig. 2.
Inventor:
Arthur I. Appleton,
by Wm. F. Freudenreich,
Atty.

Dec. 24, 1940.   A. I. APPLETON   2,225,945
EXPLOSIONPROOF SWITCH BOX OR THE LIKE
Filed March 25, 1939   2 Sheets-Sheet 2
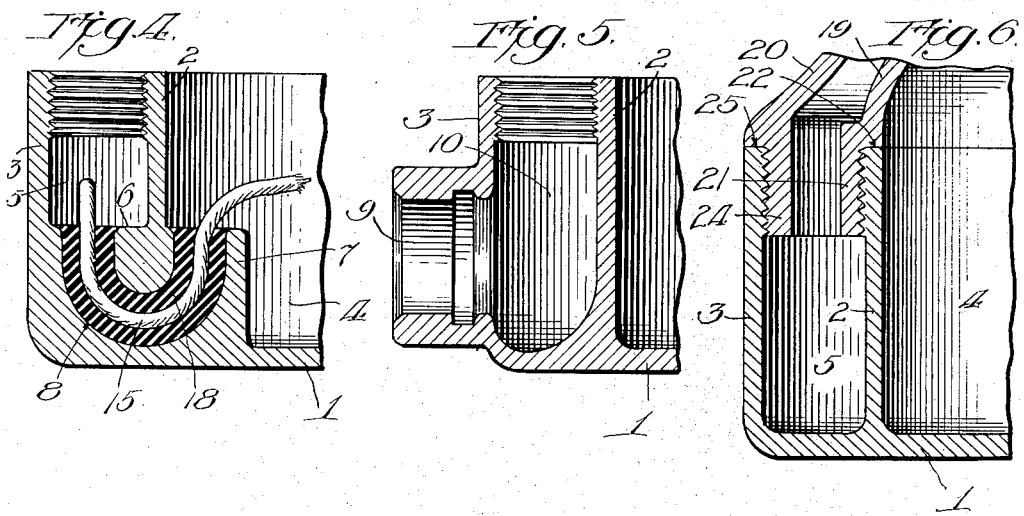
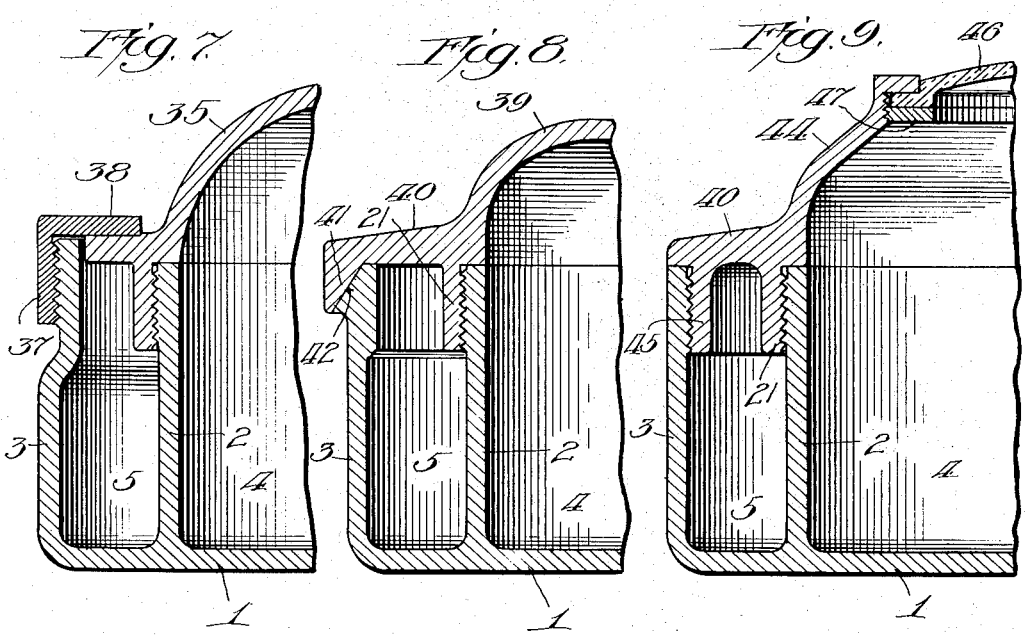
Inventor:
Arthur I. Appleton,
by Wm. F. Freudenreich,
Atty.

Patented Dec. 24, 1940

2,225,945

UNITED STATES PATENT OFFICE 2,225,945

EXPLOSIONPROOF SWITCH BOX OR THE LIKE

Arthur I. Appleton, Chicago, Ill., assignor to Appleton Electric Company, a corporation of Illinois Application March 25, 1939, Serial No. 264,110

5 Claims. (Cl. 220—3.2)

It is essential in many places that switch boxes, outlet boxes, and other boxes into which conductors enter from without be explosionproof, in the sense that no spark or flame generated within the same be capable of igniting combustible gases in the surrounding atmosphere. This can only be accomplished by properly designing the joints between the covers of the boxes, and by properly sealing the inlet through which the incoming wires enter. While the workman on the installation job need only fasten tightly a cover that has been properly designed and made in the factory, if it be necessary for him to apply the sealing compound after connecting the conductors to appliances or devices within the boxes, a considerable percentage of failures in the sealing of the inlets for the wires is certain to occur. The last-mentioned objection may be overcome by providing boxes with auxiliary chambers in which the connections to the incoming wires are made; the conductors for conveying the current to the appliances or devices in the main chambers extending through and being sealed in the walls separating the main and auxiliary chambers. In this latter type of construction the sealing of the outlet for wires from the chamber in which a spark or flame may be created can be done at the factory, so that the workman making an installation need only be sure that he makes good electrically-conductive joints between wires meeting in the auxiliary chambers.

The object of the present invention is to produce a simple and novel box of the explosion-proof type which relieves the workman making an installation from doing anything, other than fastening the covers tightly, in order to insure that the chamber in which a spark of flame may occur is effectively sealed against communication with the surrounding atmosphere.

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is a top plan view of a switch box embodying the present invention; Fig. 2 is a vertical section through the box, taken on line 2—2 of Fig. 1; Fig. 3 is a top plan view of the box with the covers removed; Fig. 4 is a section on line 4—4 of Fig. 3; Fig. 5 is a section on line 5—5 of Fig. 3; Fig. 6 is a section on line 6—6 of Fig. 3; Fig. 7 is a vertical section through a box showing a modified cover means; Fig. 8 is a view similar to Fig. 7; illustrating a still further modification in which the cover is made in one piece instead of in two pieces; Fig. 9 is a view similar to Figs. 7 and 8 illustrating a different form which the single cover may take, and also illustrating a provision that permits the box to be used to house an illuminating device or to permit the contents of the main chamber in the box to be viewed without opening the box.

Referring to Figs. 1 to 6 of the drawings, 1 represents the flat bottom of a box provided with cylindrical side walls 2 and 3 coaxial with each other and of such diameters that the main chamber 4 of the box is enclosed by the inner wall 2, whereas there is an auxiliary chamber 5 in the form of an annular trough or channel disposed between the two walls. The only communication between the two chambers, when the top of the box is covered, is through a passage for wires. In the arrangement shown, as best seen in Figs. 3 and 4, the bottom wall is thickened in the upward direction to provide a thick boss 6 that fills the bottom of the trough or channel 5 for a short angular distance, together with a second boss 7 that lies just inside of the wall 2. There is formed in this thickened part of the bottom wall of the box a passage 8 that extends through the top of the boss 7, first in a downward direction and then upwardly so as to emerge through the top face of the boss 6. In other words, the passage 8 is in the form of a trap which may be readily filled with a sealing material in liquid form by simply pouring the liquid into one end or the other of the passage and permitting it to seek its own level. Consequently, by threading wires through this U-shaped passage and then filling the passage with a suitable sealing compound, current may be carried into the main chamber without the danger of flame or gases traveling from one chamber to the other. The sealing length of the U-shaped chamber effectively blocks the passage of flame or gas from the main to outer chamber.

Wires or a cable may be brought into the auxiliary chamber 5 through a suitable inlet 9 in the outer wall 3. This inlet is shown as comprising a short sleeve-like hub or radial projection the interior of which opens directly into the lower half of the trough or channel. There is preferably placed across the lower half of the trough or channel, just beside the inlet opening, a more or less radial partition 10 that extends in a gradual curve from the floor of the channel past the lower part of the inlet opening and then upwardly beyond the top of that opening; the partition also extending more or less diagonally, as viewed from above, across the inlet opening. In other words, the partition 10 may be said to provide a warped surface which will guide a cable or wires upwardly and laterally when they are pushed into the inlet opening.

In the arrangement shown, there is a switch 11 arranged within the main chamber, the switch having four terminals to which are connected wires 14, 15, 16 and 17. These wires are carried down through the passage 8 and then up into the trough or channel 5, after which the passage is filled with a sealing compound 18 that is simply poured into the same and allowed to set. These wires are made long enough so that two of them may be carried along the trough or channel in one direction, and the other two in the opposite direction, and their ends be brought into the vicinity of the inlet 9. Then, when a workman makes an installation, he need only introduce the end of a cable, or the corresponding ends of four wires, through the inlet 9 and fasten them to the free ends of the wires already present in the box. It is thus a simple matter for the workman to connect the switch to outside lines, without fear that the seal between the switch chamber and the exterior of the box will be imperfect because of the connections between the switch and the outside wires.

The open top of the box may be effectively closed by a suitable tightly fitting cover, provided that the contacting surfaces between the cover and the box are wide enough to insure the extinguishment of any flame that might attempt to creep between them. In the arrangement shown, there are two separate covers 19 and 20; the cover 19 being a dome-shaped member having a depending flange 21 which is internally screw-threaded so that the cover may be screwed down upon the cylindrical wall 2 which is externally screw-threaded. It is only necessary to make the flange 21 deep enough so as to permit the presence of enough screw threads to provide the desired width of creepage surface. The cover 19 is preferably abruptly enlarged to the base of the flange to form a downwardly-facing annular shoulder 22 which rests on the upper edge of the wall 2 when the cover is screwed down. The cover 20 is also dome-shaped and is provided with a flange 24 which is externally screw-threaded so that it may be screwed down into the circular outer wall which is internally screw-threaded at its upper end. The cover 20 has a narrow outwardly projecting flange 25 at the base of the flange 24, this second flange being adapted to rest on top of the wall 3 when the cover is in place. The cover 20 is not only larger in diameter than the cover 19, but it is deeper so that when it is applied to the box over the inner cover, it does not make contact with the latter. With this arrangement, it will be seen that the main chamber in the box need not be opened at the time the switch or other device therein is being connected to the outside wires, because the cover 20 may be removed, without disturbing the inner cover, for the purpose of opening the trough or channel 5 and exposing the wire ends within the latter.

Each cover may be provided with a number of small radial fins or projections 26 on the sides of the dome-shaped portion thereof, for engagement with a suitable spanner or other tool for screwing or unscrewing it.

The switch may be operated in any suitable way. In the drawings I have illustrated the switch-operating means disclosed in Patent No. 2,029,599. It is sufficient to say here that the switch-operating means comprises a more or less vertically-operating handle 27 lying close to the box and fixed to the outer end of a long screw-threaded shaft 28 which extends through and in screw-threaded relation to a boss 29 arranged in the bottom of the auxiliary chamber 25 and spanning the distance between the inner and outer walls of the box. The inner end of this shaft projects into the main chamber of the box and is there provided with a switch-operating arm 30. While the screw threads on the shaft 28 may provide the requisite length of creepage surface to make the joint between this shaft and the box explosionproof, further security may be given by placing a suitable packing around the shaft where it enters the box from the outside. In the arrangement shown, the outer end of the bore into which the shaft 28 is screwed is enlarged, as indicated at 32. In the inner end of this bore is located a deformable packing ring 33 that surrounds the shaft. This packing is engaged by a suitable gland 34 screwed into the bore 32.

In Fig. 7 there is illustrated a slightly different cover arrangement. The cover 35, corresponding to the cover 19, may be like the latter, but has a wide, horizontal external flange 36 that extends across almost the entire width of the trough or channel 5 and has an accurately machined upper surface. Screwed upon the outer wall 3 is a short sleeve 37 corresponding to the screw-threaded flange on the cover 35; this sleeve having at the upper end an inwardly directed horizontal flange 38 which is pressed down upon the flange 36 when the sleeve is screwed in place.

In Fig. 8 the box has a single cover. The central portion 39 of the cover is similar to the cover 19 of the first form, and still more like the cover 35 in Fig. 7. Instead of the narrower flange 36 in Fig. 7, the cover 39 has a similarly-located wide flange 40 that projects across the top of the wall 3 and is there provided with a downturned lip 41. The lip 41 and the exterior of the wall 3 of the box meet in a joint 42 which is a short frustum of a cone. The parts are so proportioned that the faces at the joint 42 are pressed tightly together when the cover is firmly seated upon the inner wall 2.

In Fig. 9 there is shown a single cover in which the main central part 44 is similar to the covers 19 and 39. In this arrangement, instead of having the lip 41 that simply contacts a complementary surface on the outer wall of the box, I provide the flange 40 with a downwardly-projecting screw-threaded flange 45 which makes screw-threaded engagement with the outer wall 3, just as the flange 21 does with the wall 2. Actually, as illustrated, the flange 45 corresponds to the flange 24 with its associated flange 25, but is carried by a cover member corresponding to the cover 19 instead of a separate cover as in Figs. 1 to 6.

In Fig. 9 there is illustrated a further modification. If the box be one in which it may be desired to look without opening the box, or which is intended to carry an illuminating device, the central portion of the cover 44 may be cut away and the opening be filled by a suitable lens 46. In the arrangement shown, the marginal portion of the lens underlies the adjacent portion of the cover, and is engaged on the under side by a holding ring 47 screwed upwardly into the cover.

While I have illustrated and described with particularity only a single preferred form of my invention, with a few modifications, I do not desire to be limited to the exact structural details thus illustrated and described; but intend to cover all forms and arrangements which come within the definitions of my invention constituting the appended claims.

I claim:

1. A box having a bottom and cylindrical inner and outer sides or walls spaced apart to provide a main chamber surrounded by a trough or channel separated from each other, said inner wall being imperforate there being between the main chamber and the trough or channel a passage which extends downwardly from one end and then upwardly toward the other end to form a trap, said outer wall containing an outlet for conductors displaced angularly of the box with respect to the channel end of said passage, and a cover screwed upon the upper portions of both of said walls.

2. A box having a bottom and cylindrical inner and outer sides or walls spaced apart to provide a main chamber surrounded by a trough or channel separated from each other, said inner wall being imperforate there being a trapped passage extending between the main chamber and the trough or channel and being higher at the ends than at the middle, and a detachable cover extending over the top of the box and forming explosionproof joints with both of said walls.

3. A box having a bottom and cylindrical inner and outer sides or walls spaced apart to provide a main chamber surrounded by a trough or channel separated from each other, the inner of said walls being imperforate, the bottom wall being thickened upwardly between said walls and for a short distance inwardly from the outer wall, over a short distance measured angularly of the center of the box, there being a U-shaped passage for the reception of conductors and a sealing compound having the two legs thereof opening out through the top of the thickened portion of the bottom wall on opposite sides of the said inner wall, and a detachable cover extending over the top of the box and forming explosionproof joints with both of said walls.

4. A box having a bottom and cylindrical inner and outer sides or walls spaced apart to provide a main chamber surrounded by a trough or channel separated from each other, a detachable cover extending over the top of the box, cooperating screw threads on the box and on the cover to draw the cover firmly down against the upper edge faces of said walls, and a U-shaped passage for the reception of conductors and a sealing compound arranged in said bottom wall and having its legs opening through the top of said bottom wall on opposite sides of the inner wall.

5. A box having a bottom and cylindrical inner and outer sides or walls spaced apart to provide a main chamber surrounded by a trough or channel separated from each other, said inner wall being imperforate, said bottom wall having a passage extending downwardly at a point within said trough or channel and upwardly into communication with the main chamber at a point inwardly from the inner wall, cover means for said box forming explosionproof joints with both of said walls, said outer wall having an opening therein for the passage of conductors, and there being within the lower portion of said trough or channel, and extending across the width thereof, a partition that curves from a point on the outer wall adjacent to said opening across the rear of said opening to the inner wall.

ARTHUR I. APPLETON.